United States Patent
Liao et al.

(10) Patent No.: US 6,621,784 B2
(45) Date of Patent: Sep. 16, 2003

(54) CONTROL METHOD FOR EJECTING OPTICAL DISK FROM OPTICAL DISK DRIVER

(75) Inventors: Cheng-Yao Liao, Taipei (TW); Ching Ho Huang, Taipei (TW)

(73) Assignee: Lite-On It Corporation, Taipei (TW)

( * ) Notice: Subject to any disclaimer, the term of this patent is extended or adjusted under 35 U.S.C. 154(b) by 110 days.

(21) Appl. No.: 09/858,643

(22) Filed: May 17, 2001

(65) Prior Publication Data

US 2002/0172126 A1 Nov. 21, 2002

(51) Int. Cl.⁷ .............................................. G11B 33/02
(52) U.S. Cl. .................... 369/75.2; 369/30.99
(58) Field of Search ............................... 369/75.2, 75.1, 369/77.1, 77.2, 30.93, 30.94, 30.99; 360/99.02, 99.03, 99.06

(56) References Cited

U.S. PATENT DOCUMENTS

| | | | | |
|---|---|---|---|---|
| 5,210,725 A | * | 5/1993 | Kase et al. | 369/19 |
| 5,329,410 A | * | 7/1994 | Iwamoto | 360/94 |
| 6,005,833 A | * | 12/1999 | Yasuma et al. | 369/75.2 |
| 6,169,711 B1 | * | 1/2001 | Koh | 369/30.36 |
| 6,496,464 B1 | * | 12/2002 | Yamauchi et al. | 369/77.1 |

* cited by examiner

*Primary Examiner*—William Korzuch
*Assistant Examiner*—Angel Castro
(74) *Attorney, Agent, or Firm*—Rosenberg, Klein & Lee

(57) ABSTRACT

A control method for ejecting optical disk from optical disk driver is proposed and applicable to both vertical type and horizontal type optical disk drivers. The control method firstly measures the minimal voltage require by the tray motor to eject a tray with or without an optical disk loaded thereon. Afterward, the disk loading condition of the tray is examined before the ejecting voltage is applied to the tray motor. The minimal voltage determined in above is applied to the tray motor according to the disk loading condition of the tray.

2 Claims, 3 Drawing Sheets

CONTROL METHOD FOR EJECTING OPTICAL DISK FROM OPTICAL DISK DRIVER

FIELD OF THE INVENTION

The present invention relates to a control method for ejecting optical disk from optical disk driver, especially relates to a control method for smoothly and reliably ejecting optical disk from optical disk driver.

BACKGROUND OF THE INVENTION

As shown in FIGS. 1 and 2, the optical disk driver 6a generally has a magnet 2a in a clamping plate 1a and a yoke 5a of the rotation disk 4a on the spindle motor 3a. The optical disk 7a is clamped by the magnetic force between the magnet 2a and the yoke 5a. To eject the optical disk 7a, the clamping plate 1a, the rotation disk 4a and the optical disk 7a should be separated to one another. The optical disk driver has a controller 8a exerting electrical voltage to the tray motor 9a. The tray motor 9a activates an ejecting mechanism 10 to eject the optical disk 7a against the magnetic force of the magnet 2a.

However, as the optical disk 7a is to be ejected, the optical disk driver 6a is subjected to shock and vibration due to counter force. Because of the shock and vibration due to counter force, the optical disk 7a has problem to mount stably on the tray 11a, especially for vertical type optical disk driver.

Therefore, it is desirable to apply a control voltage with suitable level to the tray motor 9a in order to suppress the shock and vibration as the optical disk 7a is to be ejected.

SUMMARY OF THE INVENTION

It is the object of the present invention to provide a control method for smoothly and reliably ejecting optical disk from optical disk driver.

To achieve above object, the present invention provides a control method for ejecting optical disk from optical disk driver, which is applicable to both vertical type and horizontal type optical disk drivers. The control method firstly measures the minimal voltage require by the tray motor to eject a tray with or without an optical disk loaded thereon. Afterward, the disk loading condition of the tray is examined before the ejecting voltage is applied to the tray motor. The minimal voltage determined in above is applied to the tray motor according to the disk loading condition of the tray.

The various objects and advantages of the present invention will be more readily understood from the following detailed description when read in conjunction with the appended drawing, in which:

DETAILED DESCRIPTION OF THE INVENTION

Figure 1:
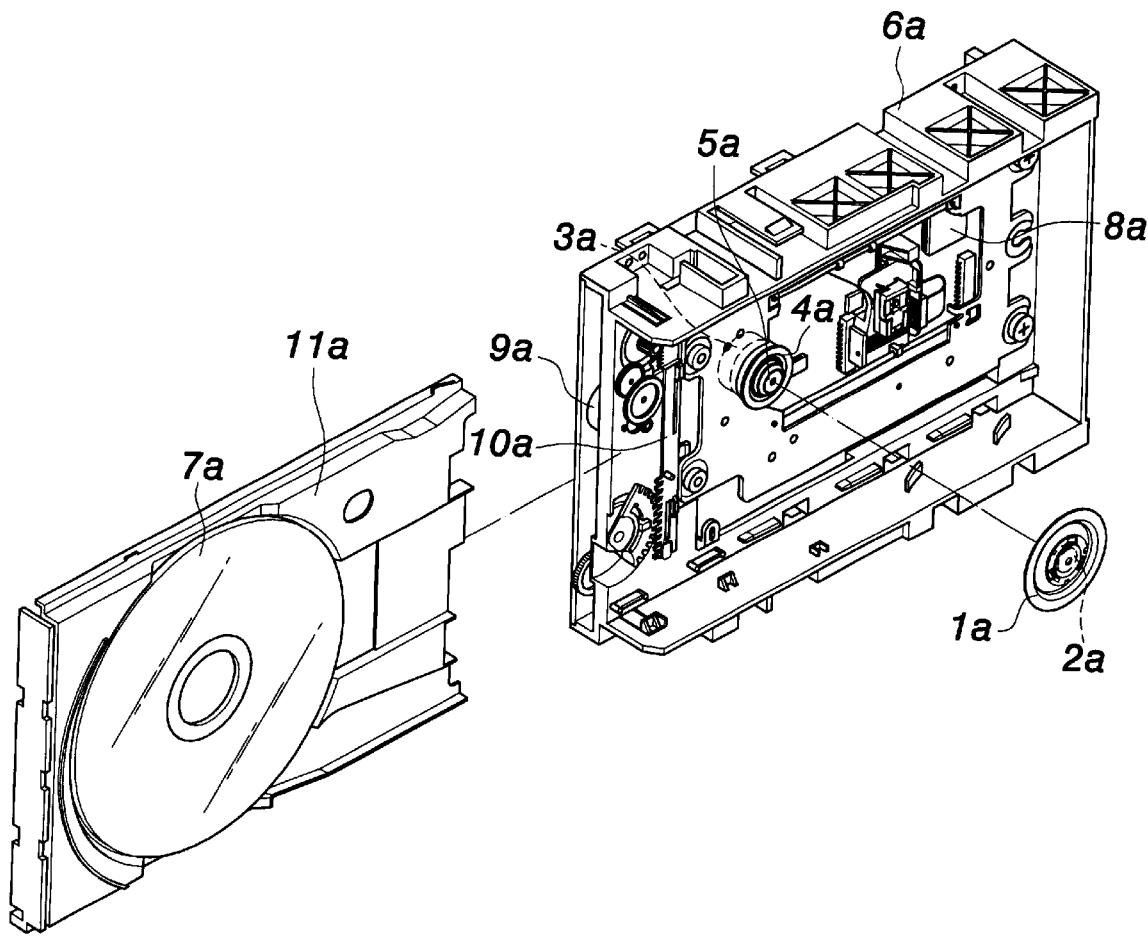
FIG. 1 shows the exploded view of prior art optical disk drive.
Figure 2:
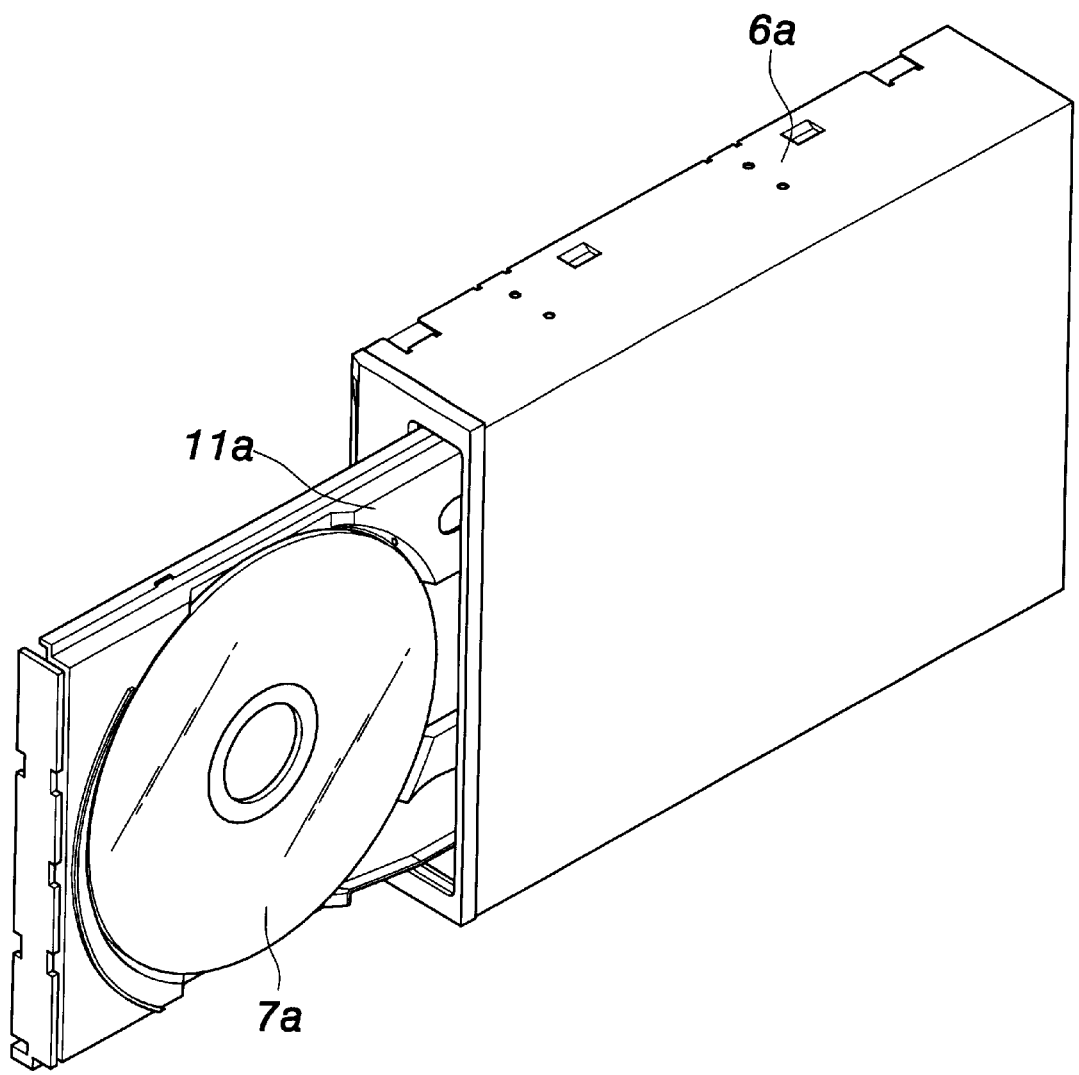
FIG. 2 shows the perspective view of prior art optical disk driver.
Figure 3:
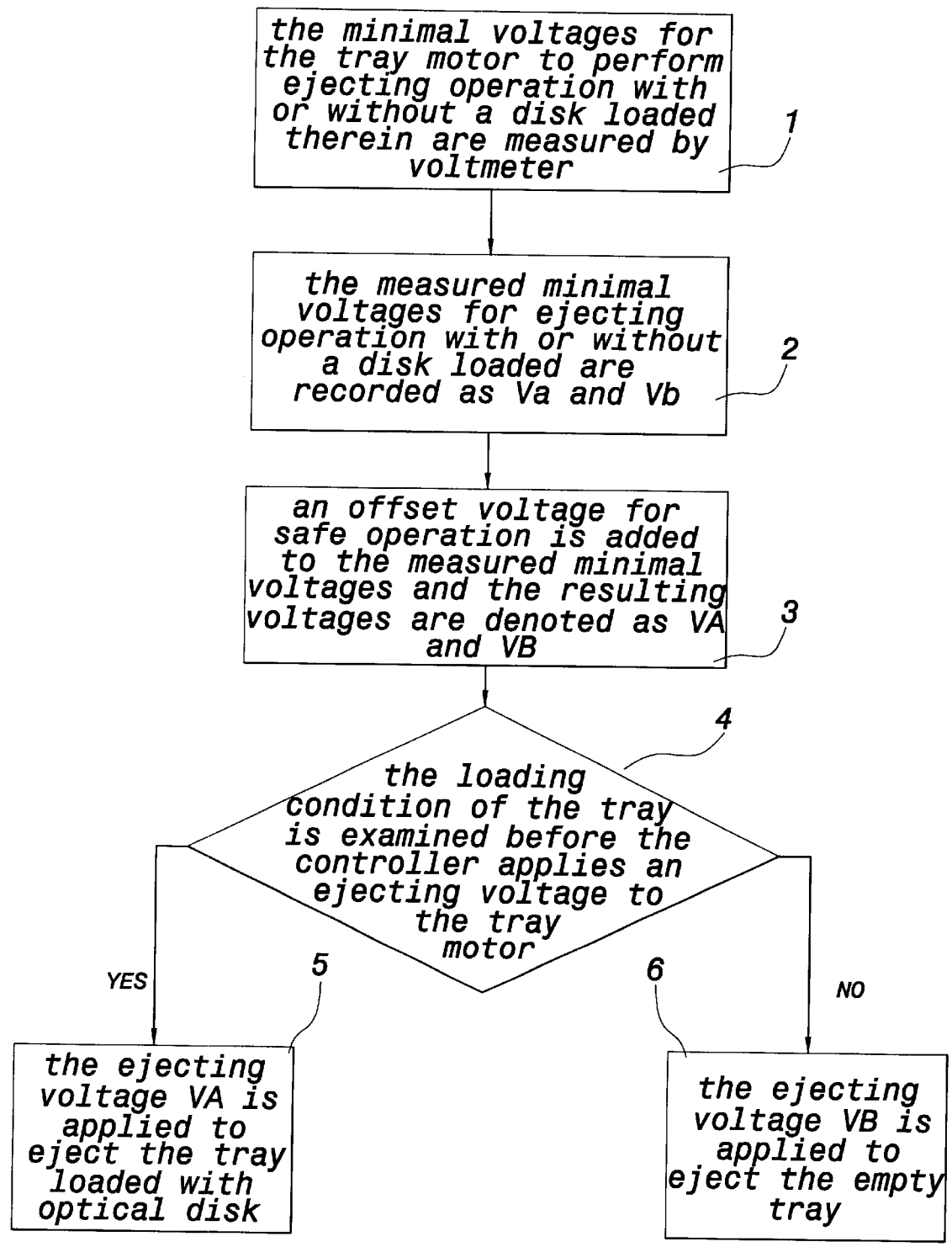
FIG. 3 shows the flowchart of the control method for ejecting optical disk from optical disk driver according to the present invention.

FIG. 3 shows the flowchart of the control method for ejecting optical disk from optical disk driver according to the present invention. This control method is applicable to both vertical type and horizontal type optical disk drivers. As shown in this figure, in first step 1, a power supply provides a DC bias to the positive and negative terminals of the tray motor and the minimal voltages for the tray motor to perform ejecting operation with or without a disk loaded therein are measured by voltmeter. In step 2, the measured minimal voltages for ejecting operation with or without a disk loaded are recorded as Va and Vb. To ensure the correct operation of the ejecting mechanism, an offset voltage for safe operation is added to the measured minimal voltages and the resulting voltages are denoted as VA and VB in step 3. In step 4, the loading condition of the tray (i.e., with or without optical disk loaded therein) is examined before the controller applies an ejecting voltage to the tray motor. If the tray is loaded with optical disk, the ejecting voltage VA is applied to eject the tray loaded with optical disk in step 5. Otherwise, the ejecting voltage VB is applied to eject the empty tray in step 6. The above operation can be described by following pseudo codes:

If disk_check=exist then apply voltage=VA;

If disk_check=not exist then apply voltage=VB;

Apply voltage to loading motor;

Execute tray out action.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A control method for ejecting an optical disk from an optical disk drive, which is applicable to both vertical type and horizontal type optical disk drive, the control method comprising the steps of:

(a) measuring a first minimal voltage required by a tray motor of an optical disk drive to eject a tray with an optical disk loaded thereon to establish a first ejecting motor drive voltage and measuring a second minimal voltage required by the tray motor to eject the tray without the optical disk loaded thereon to establish a second ejecting motor drive voltage;

(b) determining whether the optical disk is loaded on the tray before an ejecting voltage is applied to the tray motor; and (c) applying one of said first ejecting motor drive voltage or said second ejecting motor drive voltage to the tray motor responsive to the disk loading condition of the tray determined in step (b).

2. The method as recited in claim 1, wherein said step of measuring a first minimal voltage includes the step of adding a predetermined offset voltage thereto to establish said first ejecting motor drive voltage, and said step of measuring a second minimal voltage includes the step of adding said predetermined offset voltage thereto to establish said second ejecting motor drive voltage.

* * * * *